United States Patent
Coleman et al.

(10) Patent No.: US 6,273,580 B1
(45) Date of Patent: Aug. 14, 2001

(54) CANDY LIGHT LICKS

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/318,946

(22) Filed: May 26, 1999

(51) Int. Cl.[7] .................................................. F21V 33/00
(52) U.S. Cl. .......................... 362/109; 362/206; 362/253; 362/802
(58) Field of Search .................................... 362/109, 206, 362/252, 802, 253, 800

(56) References Cited

U.S. PATENT DOCUMENTS 2,618,893 * 11/1952 Gelardin et al. ..................... 362/109
4,722,035 * 1/1988 Rapisarda ............................. 362/109
5,203,624 * 4/1993 Schier et al. ......................... 362/158
5,939,983 * 8/1999 Rudell et al. ........................ 340/540

* cited by examiner

Primary Examiner—Stephen Husar
(74) Attorney, Agent, or Firm—Melvin L. Crane, Agent

(57) ABSTRACT

The light licks is a candy/toy holding device designed to light up during consumption of the candy. The light licks comprises a main housing made of plastic or any suitable material which contains a power supply, a spring, a position and a negative battery contact and the socket end of a non-breakable bulb with a LED. The non-breakable bulb extends beyond the lower end of the main housing. The upper end of the main housing has a switch button with an aperture at the top of the button which holds the candy stick and candy. The light operates when the child uses his/her mouth or tongue to push the candy and the candy stick downward applying pressure on the switch button. The switch button makes contact with the power supply and the LED lights up the bulb.

6 Claims, 1 Drawing Sheet

CANDY LIGHT LICKS

BACKGROUND OF THE INVENTION

This invention relates to a candy-light device and more particularly to a candy pop which, when being consumed, activates a light by pushing the pop down to activate a switch for the light.

Heretofore, a mouth activated light has been set forth in U.S. Pat. No. 2,696,382 in which the device is made similar to a cigar. When the cigar device is placed in one's moth, pressure by the lips closes a switch which then activates a light bulb which has a likeness of the end of a lighted cigar.

Applicants have a U.S. Pat. No. 4,914,748 which includes a switch activated by hand that controls a light that shines through a piece of candy. The candy piece causes different colors of light to be emitted as the light passes through the candy. The light shines on the user's face as the candy is consumed.

OBJECTS AND ADVANTAGES

It is therefore an object of the invention to provide a device including a candy pop with a light source activated by the user.

Another object is to provide a candy-light device in which the light can be activated or not activated while consuming the candy.

Other objects and advantages of the device will become obvious to those skilled in the art upon reading the specification and viewing the drawings.

DETAILED DESCRIPTION

Figure 1:
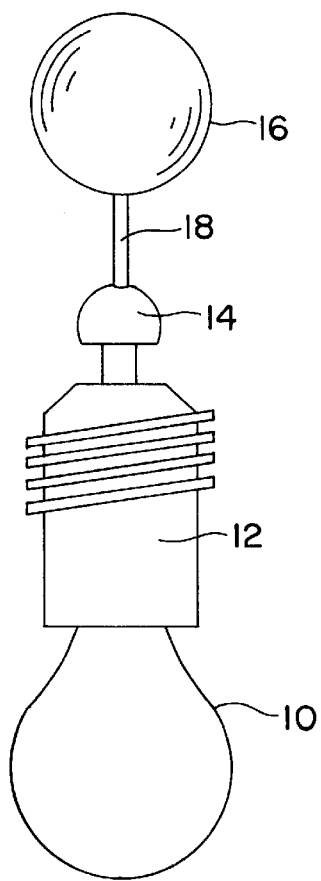
FIG. 1 illustrates a side view of the candy-light device.

Now referring to the drawings where identical parts are represented by the same reference characters, there is shown in FIG. 1 a side view of the device including a bulb 10 which may be semi-transparent plastic or a non-breakable material, and a housing which includes the bulb socket battery switch, etc. Extending from the upper end of the housing is a switch part 14 to which a candy pop is connected by a lollipop stick 18.

Figure 2:
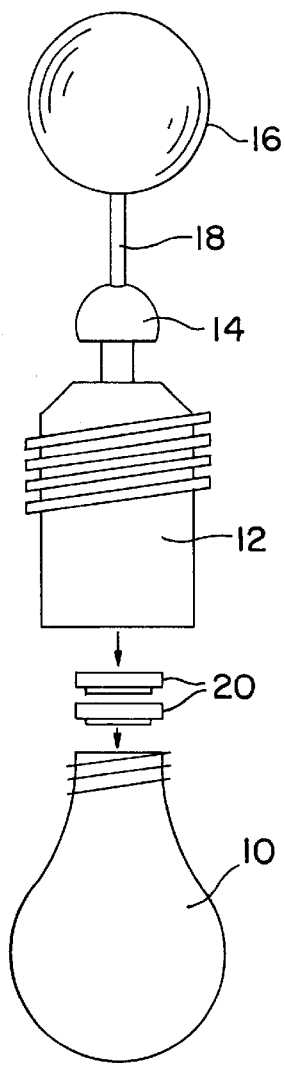
FIG. 2 illustrates a side view of the parts spaced from each other.

FIG. 2 illustrates some of the parts separated from each other as shown in FIG. 2. The power source of batteries 20 are shown in addition to the parts as described in FIG. 2.

Figure 3:
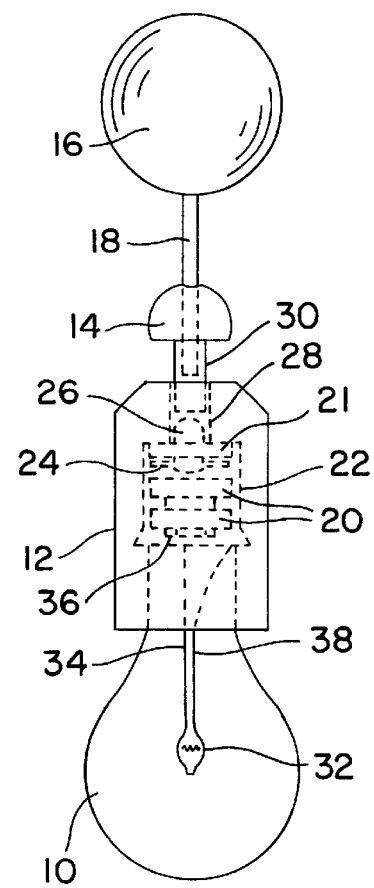
FIG. 3 illustrates a side view of the inner structures by dotted lines and with an outer decorative structure removed.

FIG. 3 illustrates the device with the inner parts shown in dotted lines. As shown, the device includes a combination bulb socket, an inner housing 22 which houses the power source batteries 20, a switch contact 21, and a spring 24 which separates the switch contact from the base of the upper battery 20. The switch contact 21 has a central protrusion 26 which extends into an aperture 28 in the upper end of the housing. The switch part 14 has an extension 30 that extends into the aperture 28 which contacts the upper end of the protrusion 26 in order to press the switch against the force of the spring to complete an electrical circuit with the bulb 10. A lower end of the candy pop stick 18 is secured on the switch part 14 by which the switch part 14 can be forced down against the protrusion 26, which in turn forces the switch contact to make contact with the power source. The bulb has a LED light 32; therefore, the bulb will not become overly heated which will not burn one's hand.

The axial wire 34 of the bulb makes contact with the positive contact 36 of the power source and the negative wire 38 of the bulb makes contact with the bulb end which is screw threaded into the bulb socket. The switch 21 then makes contact with the bulb pocket and the negative side of the power source in order to complete the circuit to the LED.

In assembly and operation of the candy-light device, the housing is made of plastic or any other suitable material. The inner part of the housing includes an opening for the switch contact 21 and a socket with screw threads in which the socket of the bulb is secured. The switch contact 21 is slid into the socket, then the spring and power sources are added in order. Once the switch contact spring and power sources are in place, the bulb is screwed into the socket which in turn holds the switch, spring, and power sources in place. Next, the switch part 14 is inserted into the aperture 28. The candy stick with the candy thereon is secured to the switch part 14. The spring forces the switch contact 21 away from the negative side of the power source which beaks the circuit between the switch contact and the power source. The switch contact remains in contact with the negative side of the LED or is made to contact the negative side of the circuit as the switch contact makes contact with the negative side of the power source.

Once the device has been assembled, the light is activated by forcing the switch part 14 downwardly to force the switch contact down making contact with the negative side of the power source. The electrical circuitry will be completed to the LED so that the light will light. The circuitry could include a flasher, not shown, which could make the light flash on and off during consumption of the lollipop.

FIGS. 1 and 2 show spaced grooves 40 on the housing which can be added to assist in holding the device during use. The housing could be made with any emblem or structure which would make the housing more pleasing to a person.

Once the candy has been consumed, the lollipop stick can be replaced by a new lollipop. Also, after consumption the light could be used for any purpose without consumption of the candy provided the switch contact is held down.

The foregoing relates to preferred exemplary embodiments of the invention, it being understood that other variants and embodiments thereof are possible within the spirit and scope of the invention, the latter being defined by the appended claims.

We claim:

1. A candy-light device which includes a housing, said housing includes a switch device including a contact operative to make and to break an electrical circuit as a function of movement of said switch contact, a power source and a bulb that extends from and is connected with a bulb holder in one end of the housing, the switch device extending from an end of said housing opposite from said bulb in combination with said switch contact for electrical excitation of said bulb, and a spring that provides a spring force against said switch contact to force said switch contact into a non-contact position relative to said power source.

2. A candy-light device as set forth in claim 1, in which said bulb is a LED.

3. A candy-light device as set forth in claim 1, in which said bulb includes therein a LED.

4. A candy-light device as set forth in claim 1, which includes a flasher for said electrical circuit.

5. A candy-light device as set forth in claim 2, which includes a flasher for said electrical circuit.

6. A candy-light device as set forth in claim 3, which includes a flasher for said electrical circuit.

* * * * *